Figure 1:
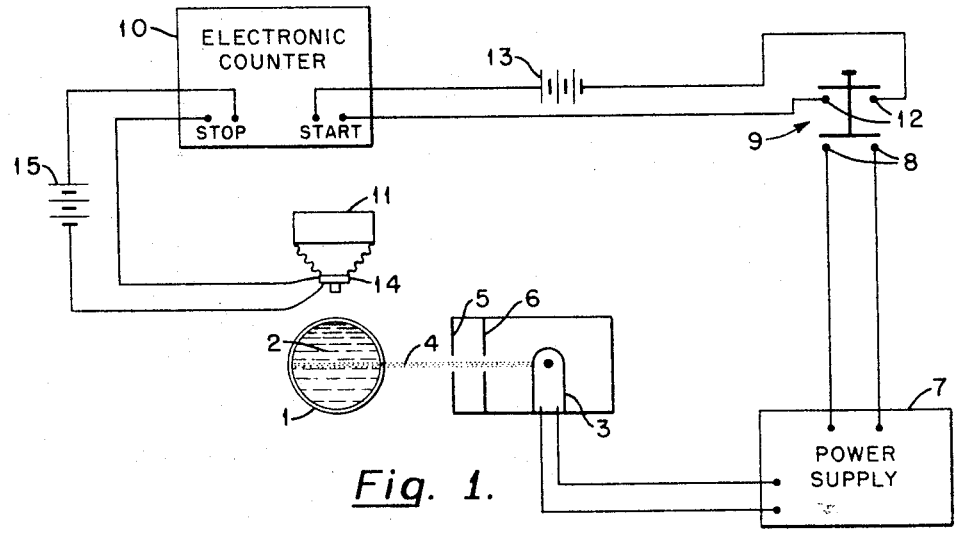

May 16, 1961     F. E. LYNCH ET AL     2,984,744
MEANS FOR VISUALIZING FLUID FLOW PATTERNS
Filed Jan. 21, 1958

INVENTORS.
Frederick E. Lynch
Luther D. Palmer
Heinz F. Poppendiek
George M. Winn BY Roland Q. Anderson
ATTORNEY

United States Patent Office 2,984,744
Patented May 16, 1961

2,984,744
MEANS FOR VISUALIZING FLUID FLOW PATTERNS

Frederick E. Lynch, Oak Ridge, Tenn., Luther D. Palmer, Leucadia, and Heinz F. Poppendiek, La Jolla, Calif., and George M. Winn, Concord, Tenn., assignors to the United States of America as represented by the United States Atomic Energy Commission Filed Jan. 21, 1958, Ser. No. 710,371

5 Claims. (Cl. 250—71)

Our invention relates generally to the fluid flow art and more particularly to a novel method of and means for determining the instantaneous velocity distribution of fluids flowing through ducts.

Workers in basic fluid flow research have always had a great interest in the instantaneous velocity distribution of fluids flowing through channels. Many useful relationships between the flow characteristics of a fluid and the physical properties of that fluid are derived from a study of basic flow patterns. In addition, the heat transfer characteristics of flowing fluids are closely allied with the flow properties of the fluid. In the past, velocity distributions have been observed by the use of Pitot tubes and hot wires which were inserted into the flow streams. Dyes, smoke particles, and finely divided particles such as aluminum powder have also been introduced into the stream thereby displaying to a limited degree, the structure of flow lines within the stream under observation.

Unfortunately, these methods have not been completely satisfactory. Here, as in any observation of natural phenomena, the observer cannot observe without inducing a change in the conditions under which the phenomena occur. The observer effect is most evident in the use of Pitot tubes, hot wires, or probes of any type because these instruments, by their presence within the stream, change the flow conditions drastically, thereby introducing uncertainties as to the validity of the observations which are made. The introduction of dyes or particles also changes experimental conditions, in that the means for the introduction for the dye particles has usually required that the introduction means be placed within the flow channel, thereby disturbing the flow pattern to a great degree. Also, dyes diffuse into the flow stream a short distance downstream from the point of introduction, thereby rendering the flow phenomena unobservable.

A flow stream may be viewed qualitatively as well as quantitatively. A qualitative observation of flow characteristics can be easily made using particles and dyes because the structural lines within the flow streams are readily visible to the observer under proper conditions, but a quantitative determination of instantaneous velocity distribution has been heretofore impossible by the use of dyes. On the other hand Pitot tubes, hot wires, or any probe type measurement will yield both a qualitative and a quantitative observation of flow characteristics. For example, a probe may be moved transversely across the flow stream and the velocity of the fluid determined at selected points within the channel. The results of this probe may be plotted in order to determine the instantaneous velocity of the fluid at any point relative to the instantaneous velocity of fluid at any other point within the flow stream. The probe method is disadvantageous because the conversion of the qualitative data to quantitative results involves laborious and tedious calculation in order to arrive at absolute velocity measurements. In addition the entire profile cannot be determined instantaneously, but must be accomplished over a relatively long time interval. Thus, the observer is never certain that experimental conditions have remained constant over the time interval required to complete the observation.

It is, therefore, a general object of our invention to provide a method of and means for qualitatively determining and displaying immediately the velocity profile of a flowing stream.

Another object of our invention is to provide a method of and means for quantitatively determining and displaying immediately the velocity profile of a flowing stream.

A further object of our invention is to provide a method of and means for determining the velocity profile of a flowing stream both qualitatively and quantitatively, without disturbing the flow conditions within the stream.

A still further object of our invention is to provide a method of and means for instantaneously determining the absolute velocity of a fluid at any point within a flowing stream.

Figure 2:
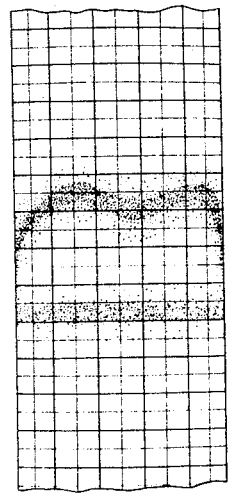
Figure 3:
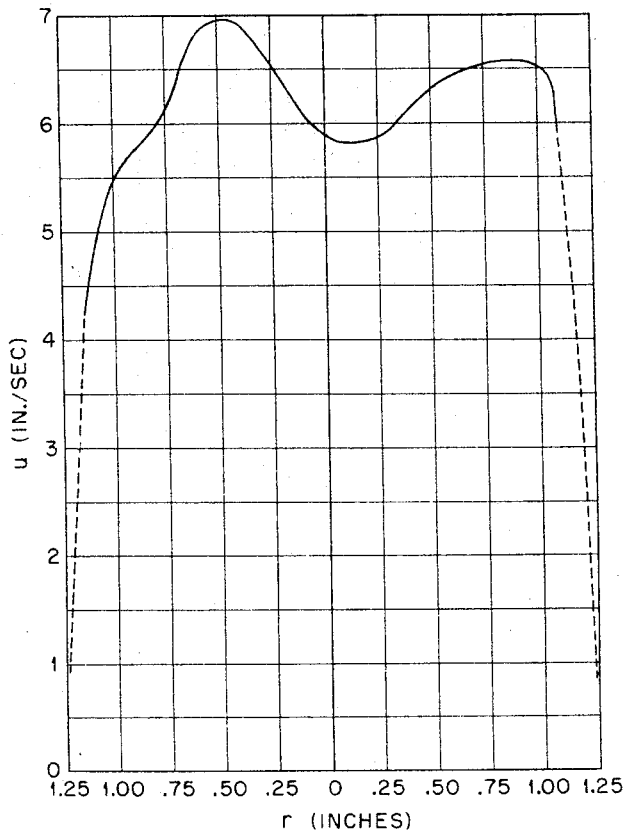

These and other objects of our invention will become apparent from the following detailed description of our invention when taken in conjunction with the accompanying drawings wherein:

Fig. 1 is a schematic representation of an apparatus adapted to meet the above objects;

Fig. 2 displays a typical velocity profile within a fluid stream and;

Fig. 3 is a graph displaying quantitatively the results of a fluid velocity distribution determination.

In accordance with the principles of our invention, we provide a method for determining the flow characteristics of fluid flowing within a conduit, which comprises incorporating in the flowing fluid a phosphorescent material, passing the fluid through a transparent section of the conduit, exciting a narrow transverse band of fluid to phosphorescence, and determining, after the passage of a preselected time interval, the change in position of any point of the excited band of fluid, the change being a measure of fluid velocity at that point.

The phosphorescent material may be incorporated in the fluid stream to form a suspension or a solution, or the fluid may in itself be inherently phosphorescent. The material must be capable of being excited from a position external to the transparent channel section. The concentration of the phosphorescent material must be high enough so that a change in position can be visually determined. We have found that activated zinc-cadmium sulfide is convenient to use as a suspension in water. A concentration of 1–3 weight percent zinc-cadmium sulfide is sufficient.

The phosphorescent material may be excited by any medium which will readily pass through the transparent walls of the channel. For example, gamma rays, neutrons, ultraviolet light and X-rays may be used; but we have found it convenient to use the spectrum from a standard xenon-filled electronic flash tube to excite the zinc or cadmium sulfide.

The change in position of the band may be observed visually for a qualitative determination and the pattern can be recorded permanently by a camera or its equivalent to provide both a quantitative and qualitative record. While the selection of phosphorescent materials is not particularly critical, the selection should be made such that the phosphorescent emission band will be recorded on a photographic emulsion if photographic recording means are used.

We have also provided an apparatus which is preferred for carrying out the above method. In general, our novel apparatus is capable of determining the absolute and relative velocities at all points within a stream of phosphorescent fluid flowing through a conduit. The apparatus comprises a transparent conduit section through which the fluid may be passed, an exciting source of radiation mounted external to the fluid for momentarily exciting a relatively narrow transverse band of the fluid at a first position, means to detect and record, after the elapse of a selected time interval, the position of the phosphorescent band of fluid relative to the first position, the change in position of the band being a measure of fluid velocity, and means to determine the time elapsed during said selected time interval.

The conduit in the above apparatus may be fabricated from any material which will transmit visible light, and it may be of any cross-sectional shape. It is not even necessary that the cross sectional shape and its area be constant in a longitudinal direction. Our invention is applicable to curved sections of conduit, convergencies, divergencies, loops and any other shape commonly encountered. The term "phosphorescent fluid" includes suspensions, solutions, and fluids, which in themselves are inherently phosphorescent. Any convenient exciting source, which is compatible with a phosphorescent material which is utilized, is suitable for use in our invention. While X-rays, gamma rays and ultraviolet light may be satisfactory for some phosphorescent materials, we have found that light from a standard xenon-filled electronic flash tube is convenient and suitable when zinc-cadmium sulfide is used.

The position of the excited band of fluid, after the delay, may be suitably determined by photocells, cameras, or their equivalents. However, the camera is preferable because it yields a permanent pictorial record of the flow characteristics.

We provide two means to determine the time elapsed during the selected time interval. The first and preferred means comprises a standard electronic counter adapted to be initiated upon the receipt of a start signal derived from the operation of the exciting source, and terminated upon the receipt of a stop signal derived from the operation of the recording means.

The second means also includes a standard electronic counter which is adapted to be initiated upon the receipt of a start signal derived from the operation of the exciting source. This scheme differs from the preferred means in that the counter provides a signal, after the elapse of the selected time interval, from which signal the recording means is operated. A camera having an electrically actuated shutter is suitable as the recording means.

Referring now to Fig. 1, which is a schematic representation of a preferred embodiment of our novel apparatus, a cross section of a test conduit 1 is shown carrying a phosphorescent fluid 2. A xenon-filled electronic flash tube 3 provides an exciting energy in the form of light rays 4 which are collimated by collimators 5 and 6. The flash tube 3 is energized by a standard power supply 7, which is adapted to furnish, for example, 3200 watt-sec. of energy to lamp 3 only upon the completion of the circuit at contacts 8 of a double pole switch 9. An electronic counter 10 is provided to measure the delay between the energizing of the flash tube 3 and the operation of a camera 11. Upon the closing of contacts 12 of switch 9, a start signal is sent to the counter 10 through the circuit which contains a 4½ volt battery 13. The camera 11 is provided with a shutter 14 having a millisecond delay. Upon operation of the shutter 14, a pair of contacts within the shutter are closed after the millisecond delay, thereby completing a circuit through a 4½ volt battery 15 and sending a stop signal to the counter 10.

The operation of the apparatus shown in Fig. 1 is initiated by closing the single-throw double-pole switch 9, thereby simultaneously starting the counter 10 and discharging the charge in the power supply 7 through the flash tube 3. Consequently, a transverse band of fluid 3 is excited to phosphorescence and a velocity profile is formed as the fluid moves through the conduit. After a brief interval, when a profile has been formed, the shutter 14 is closed, thereby recording the velocity profile on a high-speed photographic emulsion and stopping the timer simultaneously. In order to obtain a zero reference line, the apparatus may be first operated at zero flow and the resultant stationary phosphorescent band photographed on the same emulsion which is then used to record the velocity profile. The resultant photograph, obtained by a double-exposure, will show the position of the phosphorescent band relative to its position at excitation.

A quantitative measurement requires the determination of the absolute distance which all points on the phosphorescent band moved during the selected time interval. This may be accomplished by any manner of measurement, but we have found it convenient to photograph a rectangular gridwork of known dimensions while the gridwork is positioned within the fluid-filled test section, before flow is started, so as not to interfere with the actual flow measurements. The resultant photographic negative may then be superimposed over the photograph of the velocity profile and absolute distances may be determined directly.

The following example is offered as illustrative of one manner in which our novel method may be practiced using the apparatus as shown in Fig. 1.

*Example 1*

A two pound charge of zinc-cadmium sulfide was introduced into 80 gallons of water contained in a recirculating flow system. A plastic conduit having a circular cross section (2.5 inch I.D.) was used as the test section as shown in Fig. 1. The apparatus was operated at zero flow to obtain a photograph of the phosphorescent band at its excitation point and circulation of the fluid was then initiated. After the flow had reached a steady velocity, the electronic flash tube was actuated and a photograph was made of the resultant velocity profile, on the same emulsion which was used to record the excitation point, in a darkened room using a high speed (ASA<600) panchromatic film in a 4 inch x 5 inch camera. Fig. 2 is a drawing which shows the velocity profile recorded by the camera. The photograph from which Fig. 2 was drawn was a composite print of the velocity profile upon a previously-photographed gridwork of known dimensions. In Fig. 2, the gridwork contained 20 divisions per inch.

The electronic counter indicated that 0.23731 second had elapsed between the excitation of the fluid and the recording thereof by the camera. The longitudinal distances, between the plane of excitation and all points of the recorded profile were determined from Fig. 2. By dividing each distance by the elapsed time, a plot of velocity as a function of radial distance was obtained, as shown in Fig. 3.

Although the above example was obtained by use of one embodiment of apparatus, our invention should not be interpreted as being limited by either the description of the preferred apparatus embodiment or the specific example used above. Changes and modifications within the scope of our invention will be apparent to those skilled in the art, especially in view of our description contained herein. It is intended that our invention be limited only as indicated by the appended claims.

Having described our invention, we claim:

1. An apparatus for determining both the absolute and relative velocities of a phosphorescent fluid flowing through a transparent conduit section, comprising means located at a first position along said conduit section external to said fluid for inducing phosphorescence in a narrow transverse band of said fluid, means located at a second position downstream from said first position and external to said fluid for detecting the position of all points of the downstream profile of said phosphorescence, and means for measuring the elapsed time between the operation of said inducing means and the operation of said detecting means.

2. An apparatus for determining both the absolute and relative velocities of a phosphorescent fluid flowing through a transparent conduit section, comprising means located at a first position along said conduit section external to said fluid for inducing phosphorescence in a narrow transverse band of said fluid, means for simultaneously deriving a first signal and actuating said inducing means, means located at a second position downstream from said first position and external to said fluid for detecting the position of all points of the downstream profile of said phosphorescence, means responsive to the operation of said detecting means for deriving a second signal, and means to measure the elapsed time between said first and second signals.

3. An apparatus for determining both the absolute and relative velocities of a phosphorescent fluid flowing through a transparent conduit section, comprising means located at a first position along said conduit section external to said fluid for inducing phosphorescence in a narrow transverse band of said fluid, means responsive to the operation of said inducing means for deriving a timing signal, means to delay said timing signal for a selected time interval, and means lcated at a second position downstream from said first position and external to said fluid, and actuated by said delayed timing signal for detecting the position of all points of the downstream profile of said phosphorescence.

4. The apparatus of claim 2 wherein said detecting means is a camera.

5. The appartus of claim 3 wherein said detecting means is a camera having an electrically actuated shutter.

References Cited in the file of this patent
UNITED STATES PATENTS

| | | |
|---|---|---|
| 2,599,975 | Carpenter | June 10, 1952 |
| 2,631,242 | Metcalf | Mar. 10, 1953 |
| 2,640,936 | Pajes | June 2, 1953 |
| 2,826,699 | Hull | Mar. 11, 1958 |

OTHER REFERENCES

"Solving A Wind Tunnel Problem," by McLarren, Aviation Week, June 20, 1949, pages 19, 20, 22 and 24.

Haendler et al.: Abstract of Application Serial No. 631,420, published Mar. 14, 1950 in O.G., vol. 632, page 615.